United States Patent
De Pau, Jr. et al.

(10) Patent No.: US 10,900,368 B2
(45) Date of Patent: Jan. 26, 2021

(54) SEAL SYSTEMS FOR USE WITH AIRCRAFT

(71) Applicant: The Boeing Company, Chicago, IL (US)

(72) Inventors: Robert De Pau, Jr., Kenmore, WA (US); Rachel Elaine De Pau, Kenmore, WA (US)

(73) Assignee: THE BOEING COMPANY, Chicago, IL (US)

( * ) Notice: Subject to any disclaimer, the term of this patent is extended or adjusted under 35 U.S.C. 154(b) by 82 days.

(21) Appl. No.: 16/143,028

(22) Filed: Sep. 26, 2018

(65) Prior Publication Data
US 2020/0095879 A1   Mar. 26, 2020

(51) Int. Cl.
*F16J 15/02* (2006.01)
*F01D 11/00* (2006.01)
*B64D 29/08* (2006.01)

(52) U.S. Cl.
CPC .......... *F01D 11/005* (2013.01); *F16J 15/027* (2013.01); *B64D 29/08* (2013.01); *F05D 2220/323* (2013.01); *F05D 2240/55* (2013.01)

(58) Field of Classification Search
CPC .... F01D 11/005; F01D 11/006; F01D 11/008; F16J 15/027; F16J 15/02; F16J 15/46; F16J 15/48; B64D 29/08; B64D 29/00; F05D 2220/323; F05D 2240/55
USPC ........................................................ 277/312
See application file for complete search history.

(56) References Cited

U.S. PATENT DOCUMENTS

| | | | | |
|---|---|---|---|---|
| 2,938,245 A | * | 5/1960 | Sehn | B60J 10/80 296/149 |
| 3,284,957 A | * | 11/1966 | Landis | B61D 19/00 49/495.1 |
| 2010/0044466 A1 | * | 2/2010 | Vauchel | F01D 11/005 239/265.11 |
| 2010/0132331 A1 | * | 6/2010 | Tsou | F01D 11/003 60/226.2 |
| 2011/0024994 A1 | * | 2/2011 | Bunel | F16J 15/027 277/637 |
| 2011/0037228 A1 | * | 2/2011 | Thomas, Jr. | F16J 15/027 277/312 |
| 2017/0284216 A1 | | 10/2017 | Khidekel | |

(Continued)

FOREIGN PATENT DOCUMENTS

| EP | 3255320 | 12/2017 |
|---|---|---|
| FR | 2886362 | 12/2006 |

OTHER PUBLICATIONS

European Patent Office, "Extended European Search Report," issued in connection with European Patent Application No. 19199133.0, dated Feb. 24, 2020, 8 pages.

(Continued)

*Primary Examiner* — Nathan Cumar
(74) *Attorney, Agent, or Firm* — Hanley, Flight & Zimmerman, LLC (57) ABSTRACT

Seal systems for aircraft are disclosed. An example seal system includes a first seal to couple to a first thrust reverser portion, the first seal having a first cross-sectional shape. A second seal is to couple to a second thrust reverser portion opposite the first seal. The second seal having a second cross-sectional shape different than the first cross-sectional shape. The second seal is to receive at least a portion of the first seal in response to the first seal engaging the second seal.

21 Claims, 8 Drawing Sheets

(56) References Cited

U.S. PATENT DOCUMENTS

2018/0156051 A1\* 6/2018 Strutt ................. F01D 11/003
2018/0156129 A1\* 6/2018 Takeuchi ............. B64D 29/00

OTHER PUBLICATIONS

European Patent Office, "Communication pursuant to Article 94(3) EPC," issued in connection with European Patent Application No. 19 199 133.0, dated Nov. 30, 2020, 5 pages.

\* cited by examiner

SEAL SYSTEMS FOR USE WITH AIRCRAFT

FIELD OF THE DISCLOSURE

This disclosure relates generally to aircraft and, more particularly, to seal systems for use with aircraft.

BACKGROUND

Aircraft engines employ thrust reversers that are movable between an open position and a closed position for maintenance and inspection. A gap, which typically forms between the thrust reversers when the thrust reversers are in the closed position, can cause engine bypass air leakage. To seal the gap and prevent bypass air leakage, aircraft engines often employ a bulb seal. For example, the bulb seal is often coupled to a first thrust reverser panel and engages or contacts a second thrust reverser panel when the thrust reversers are in the closed position.

SUMMARY

An example seal system includes a first seal to couple to a first thrust reverser portion, the first seal having a first cross-sectional shape. A second seal is to couple to a second thrust reverser portion opposite the first seal. The second seal having a second cross-sectional shape different than the first cross-sectional shape. The second seal is to receive at least a portion of the first seal in response to the first seal engaging the second seal.

An example seal system includes a first seal having a first sealing body, and a second seal having a second sealing body. At least a portion of the second sealing body to deform and wrap around at least a portion of the first sealing body in response to the first seal engaging the second seal.

An example seal system includes first means for sealing, where the first means for sealing has a first cross-sectional shape. The system includes second means for sealing, where the second means for sealing having a second cross-sectional shape different than the first cross sectional shape. The second means for sealing is to receive at least a portion of the first means for sealing in response to the first means for sealing engaging the second means for sealing.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Known aircraft engines employ seals or seal systems to seal a gap at an interface between two aircraft structures (e.g., engine thrust reversers, doors, frames, etc.) to reduce air leakage and/or contain fire. During flight, pressure fluctuations can cause one or more structures employing the seals to shift, bend, deflect or otherwise move relative to the seal and/or other structures of the aircraft. In some examples, shifting of the one or more structures can cause the seals to become over-compressed and/or under-compressed. For example, a bulb seal works optimally when compressed to 20% to 40% of its uncompressed diameter. Over-compression of bulb seals (e.g., compression that is greater than 40% of the uncompressed diameter) can cause creasing and/or wear and under-compression of the bulb seals (e.g., compression that is less than 20% of the uncompressed diameter) can cause air leakage and/or seal fatigue, resulting in premature failure of the seals and/or reducing an operating life of the seals. In some instances, over-compression of the bulb seals (e.g., greater than 50% compression of the uncompressed diameter) can cause permanent deformation of the seals, thereby rendering the seal ineffective. Additionally, leaking seals reduce aircraft engine efficiency and can impact fire detection, containment and/or extinguishing. Further, such known seals typically seal along a point of contact having a relatively small contact surface area. As a result, any defects or notches that may form on an outer surface of the seal can affect (e.g., reduce) sealing capability of the seal.

In some instances, high-velocity air impingement from leakage can also cause damage to adjacent components (e.g., firewall blankets) downstream of the seal. For example, aircraft engines employing thrust reversers have seals between inner walls of thrust reverser halves of a nacelle. For example, a first portion or half of a thrust reverser can open relative to a second portion or half of the thrust reverser to provide access to the aircraft engine. The seals of the aircraft engines seal a perimeter of the first and second halves of the thrust reverser when the thrust reverser is in a closed position. Some examples seals include a bulb seal (e.g., an omega-style seal) on a first thrust reverser half that compresses and seals against a metallic seal depressing surface located on the second thrust reverser half. However, such bulb seals may not be able to provide a sufficiently tight seal during aircraft operation (e.g., flight) due to displacement of the aircraft structures (e.g., the first thrust reverser half and the second thrust reverser half) that causes the bulb seal to become over-compressed or under-compressed. In some instances, such effects of displacement of the aircraft structures can cause premature failure of the seals and/or may not provide a sufficiently tight seal.

Example seal systems disclosed herein significantly increase operational life of seals while providing a more effective seal (e.g., an increased sealing force) compared to known seals or sealing systems. For example, example seal systems disclosed herein can seal over a larger range of relative displacements of aircraft structures during aircraft operation without becoming over-compressed (e.g., greater than 50% of an uncompressed dimensional characteristic such as, a diameter, a width, etc.) by excessive compressive forces. Additionally, the example seal systems disclosed herein can surround or encase a fire zone of an aircraft engine and provide a tortuous path that prevents or restricts fire from leaving a designated fire zone of the aircraft engine.

Example seal systems disclosed herein provide a seal at an interface between a first aircraft structure and a second aircraft structure. For example, a seal system disclosed herein can seal an interface between a thrust reverser and a pylon of an aircraft, an interface between a thrust reverser and an engine core, an interface between a first thrust reverser portion and a second thrust reverser portion and/or any other interface of an aircraft. In some examples, the seal systems disclosed herein can prevent high-pressure air leakage from an engine bypass to a fire compartment of an aircraft engine and/or prevent or extinguish fire from entering the engine bypass. Each example seal system disclosed herein includes a first seal and a second seal. In some examples, the first seal is a bulb-style seal and the second seal is a cup-style seal. In some examples, the cup-style seal replaces a standard flat metallic seal depressing surface of a traditional or known nacelle.

The first seal of example sealing systems disclosed herein interacts with or engages the second seal to provide tight seal. Specifically, the second seal is structured to partially collapse relative to the first seal to form a pocket to receive at least a portion of the first seal. For example, a concave or cup section of the second seal wraps around at least a portion of the first seal (e.g., a portion of a circumference of the first seal) to create a tight seal (e.g., a tight aerodynamic seal). In this manner, the first seal engages the second seal over a greater amount of contact surface area compared to known seals. This increase in contact surface area provides a greater frictional force between the first and second seals, thereby improving a sealing force of the seal system. Additionally, this increase in contact surface area reduces or eliminates the reduction in sealing effectiveness caused by notches, defects and/or permeant deformation that can form on the first seal and/or the second seal. In other words, the first and second seals can provide a relatively tight seal irrespective of notches, defects and/or permanent deformations of the first seal and/or the second seal.

Figure 1:
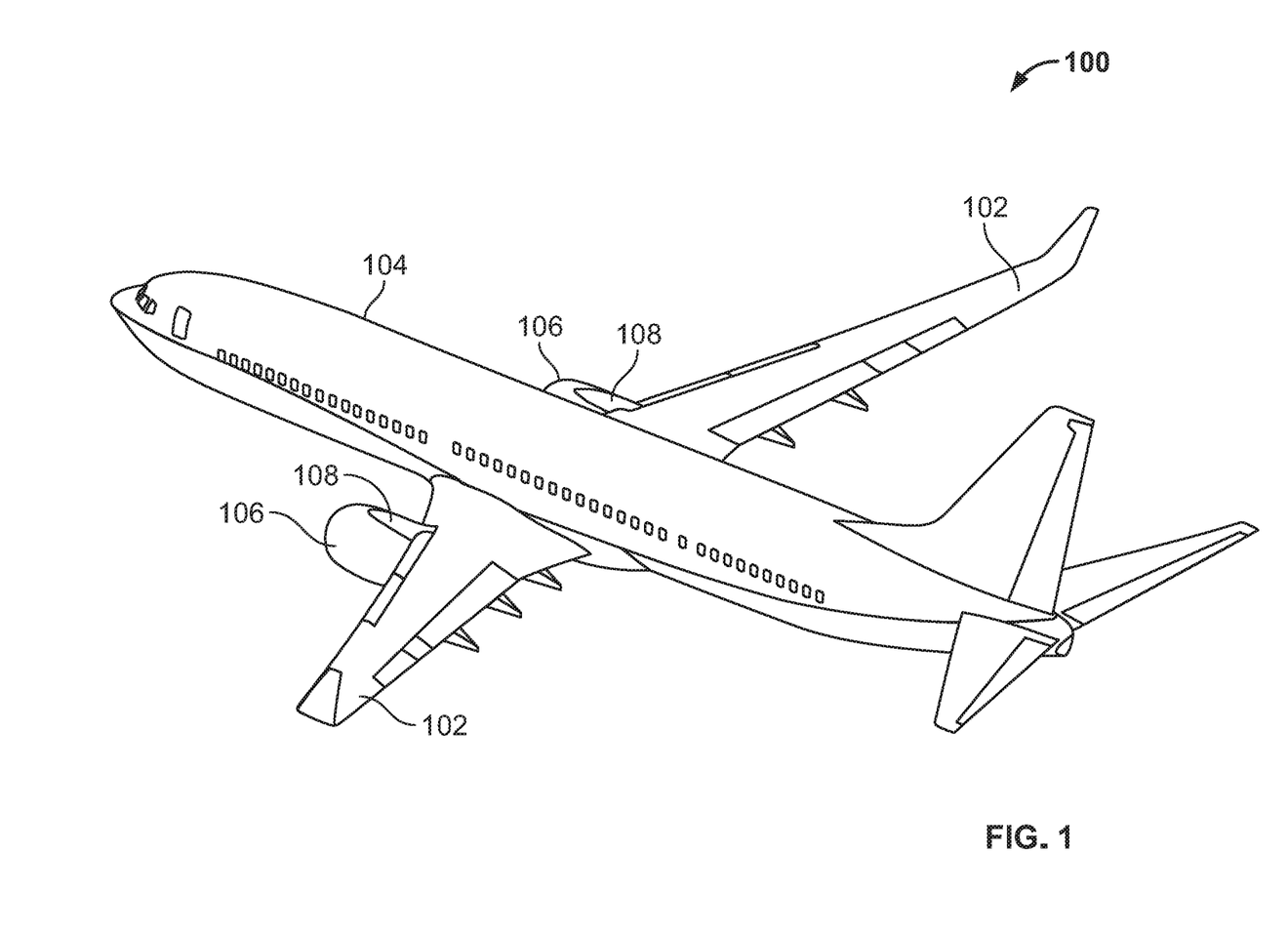
FIG. 1 illustrates an example aircraft having an example seal system in accordance with the teachings of this disclosure.

FIG. 1 illustrates an example aircraft 100 that embodies aspects of teachings of this disclosure. The aircraft 100 of FIG. 1 includes wings 102 (e.g., a right wing and a left wing) extending laterally outward from a fuselage 104. Each of the wings 102 of the illustrated example supports an aircraft engine 106 via a pylon 108. Each aircraft engine 106 of the illustrated example is gas turbine (e.g., a turbofan engine) that can embody aspects of the teachings of this disclosure.

The example teachings of this disclosure are not limited to the aircraft 100 of FIG. 1. For example, example seal systems disclosed herein can be implemented with other types of aircraft such as, for example, vertical takeoff and landing aircraft, military aircraft, helicopters, drones, and/or any other type of aircraft. In some examples, the seals disclosed herein can be implemented with other types of vehicles including, but not limited to, a ship, a submarine, a ground vehicle (e.g., a race car, a train, an automobile, a bus, etc.) and/or any other vehicle or aerodynamic surface(s). Example seal systems disclosed herein can be used with aircraft engines, aircraft structures (e.g., a fuselage) and/or any other aircraft structure that may need a seal. In some examples, the seal systems disclosed herein can be employed with buildings (e.g., garage doors, appliance doors, etc.) and/or other structures that may employ a seal.

Figure 2:
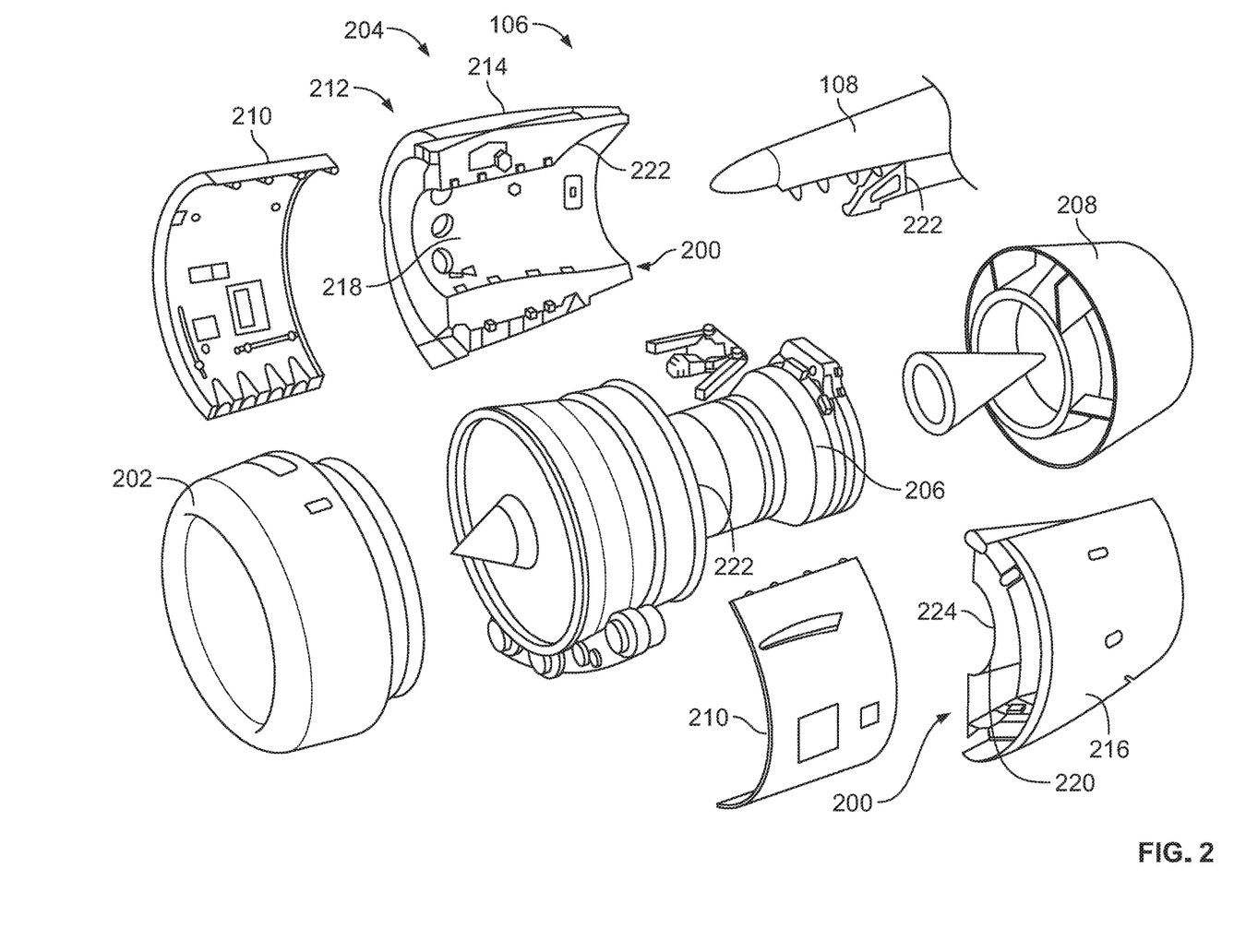
FIG. 2 is a partially exploded view of the example aircraft engine of FIG. 1.

FIG. 2 is an exploded view of the aircraft engine 106 of FIG. 1 having a seal system 200 disclosed herein. The aircraft engine 106 of the illustrated example couples to the wing 102 via the pylon 108. The aircraft engine 106 includes an inlet 202, a nacelle 204, an engine core 206, and a nozzle 208. The nacelle 204 of the illustrated example includes fan doors 210 and a thrust reverser 212. The thrust reverser 212 of the illustrated example includes a first thrust reverser portion 214 (e.g., a right-hand thrust reverser or first half) and a second thrust reverser portion 216 (e.g., a left-hand thrust reverser or second half). For example, the first thrust reverser portion 214 includes a first wall 218 and the second thrust reverser portion 216 includes a second wall 220. The first and second thrust reverser portions 214, 216 encompass or surround the engine core 206. Additionally, the thrust reverser 212 is movably coupled (e.g. pivotally coupled) to the pylon 108 to allow access to the engine core 206 during maintenance.

Figure 3:
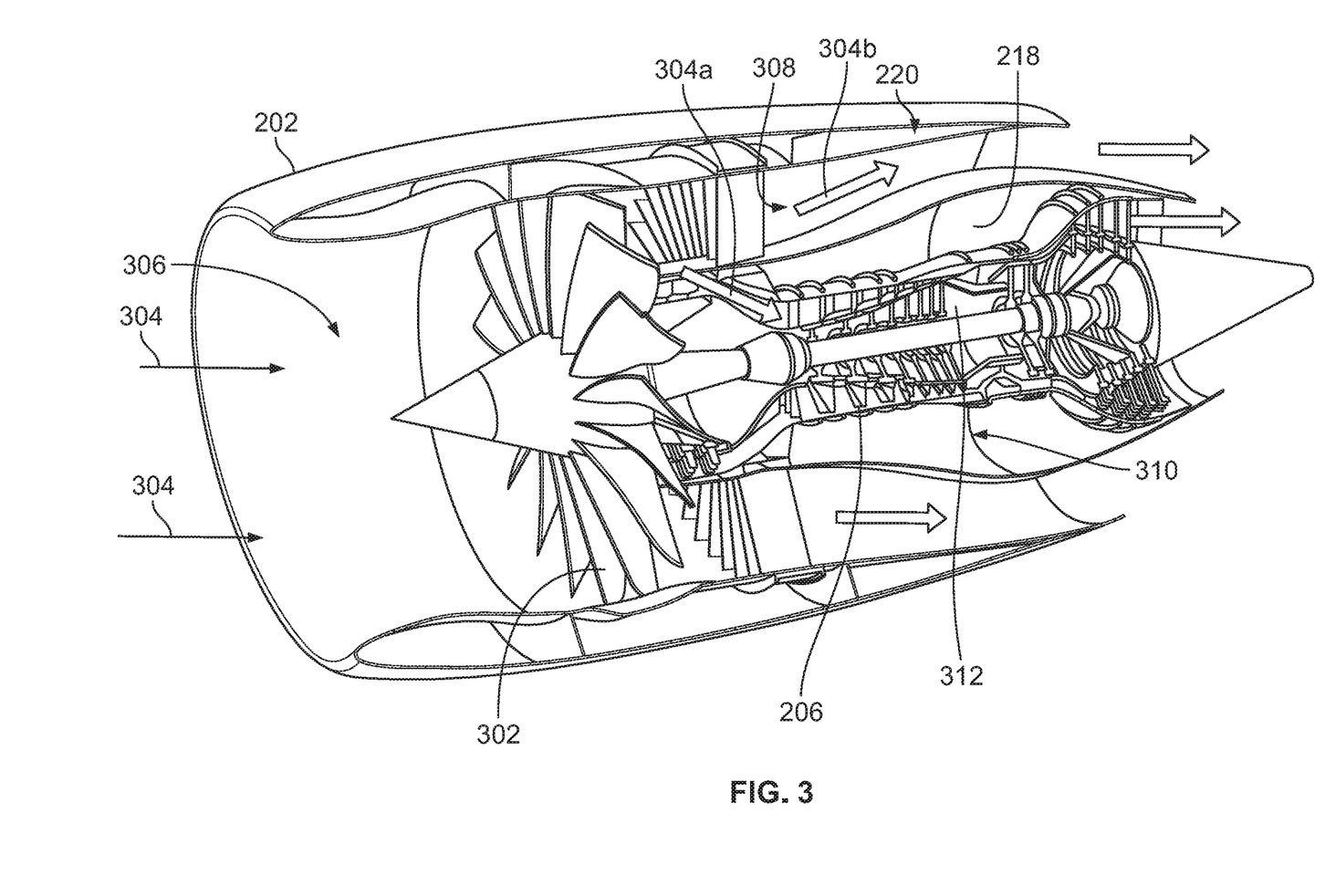
FIG. 3 is a perspective, sectional view of an example aircraft engine of the example aircraft of FIGS. 1-2.

FIG. 3 is a cross-sectional view of the aircraft engine 106 of FIG. 1. The aircraft engine 106 has a fan 302 that draws airflow 304 into an air intake 306 defined by the inlet 202. The thrust reverser 212 defines a bypass 308 between the engine core 206 and the first and second walls 218, 220 (FIG. 2). Additionally, the thrust reverser 212 of the illustrated example defines a designed core compartment fire zone 310. In operation, a portion 304a of the airflow 304 flows to the engine core 206 and a portion 304b of the airflow 304 flows through the bypass 308. The airflow 304 provided by the air intake 306 to the engine core 206 is highly pressurized (e.g., via a compressor) and provided to a combustion chamber 312 of the engine core 206, where fuel is injected and mixed with the highly pressurized air and ignited. The thermal energy from the combustion chamber 312 of the engine core 206 is exhausted (e.g., via a turbine) to the nozzle 208 (FIG. 2) where it mixes with a portion of the airflow (e.g., cool air) that was accelerated by the fan 302 through the bypass 308. The converted thermal energy of the engine core 206 and the accelerated airflow of the bypass 308 are exhausted from the nozzle 208 to produce forward thrust that provides lift and/or propels the aircraft 100 (e.g., in a forward direction).

The seal system 200 disclosed herein prevents aerodynamic losses of the portion 304b of the airflow 304 in the bypass 308. For example, the seal system 200 of the illustrated example prevents the portion 304b of airflow 304 in the bypass 308 from leaking into the core compartment fire zone 310. Additionally, the seal system 200 of the illustrated example prevents fire from escaping from the core compartment fire zone 310 and into the bypass 308 and/or other portions of the aircraft engine 106. Thus, the seal system 200 provides a fire seal to contain fire in the designated core compartment fire zone 310.

Figure 4:
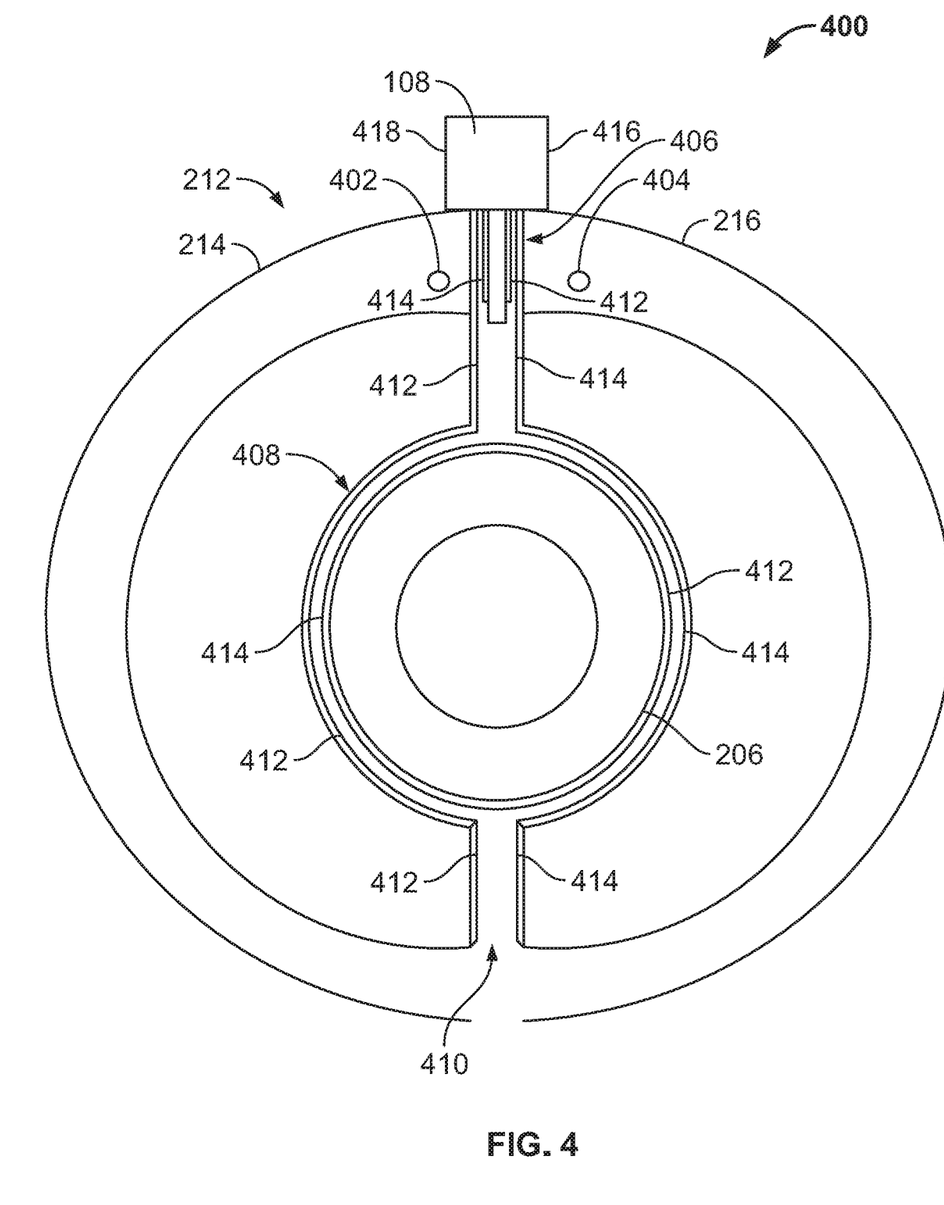
FIG. 4 is a schematic, front view of the example aircraft engine of FIGS. 1-3 in a closed position.
Figure 5:
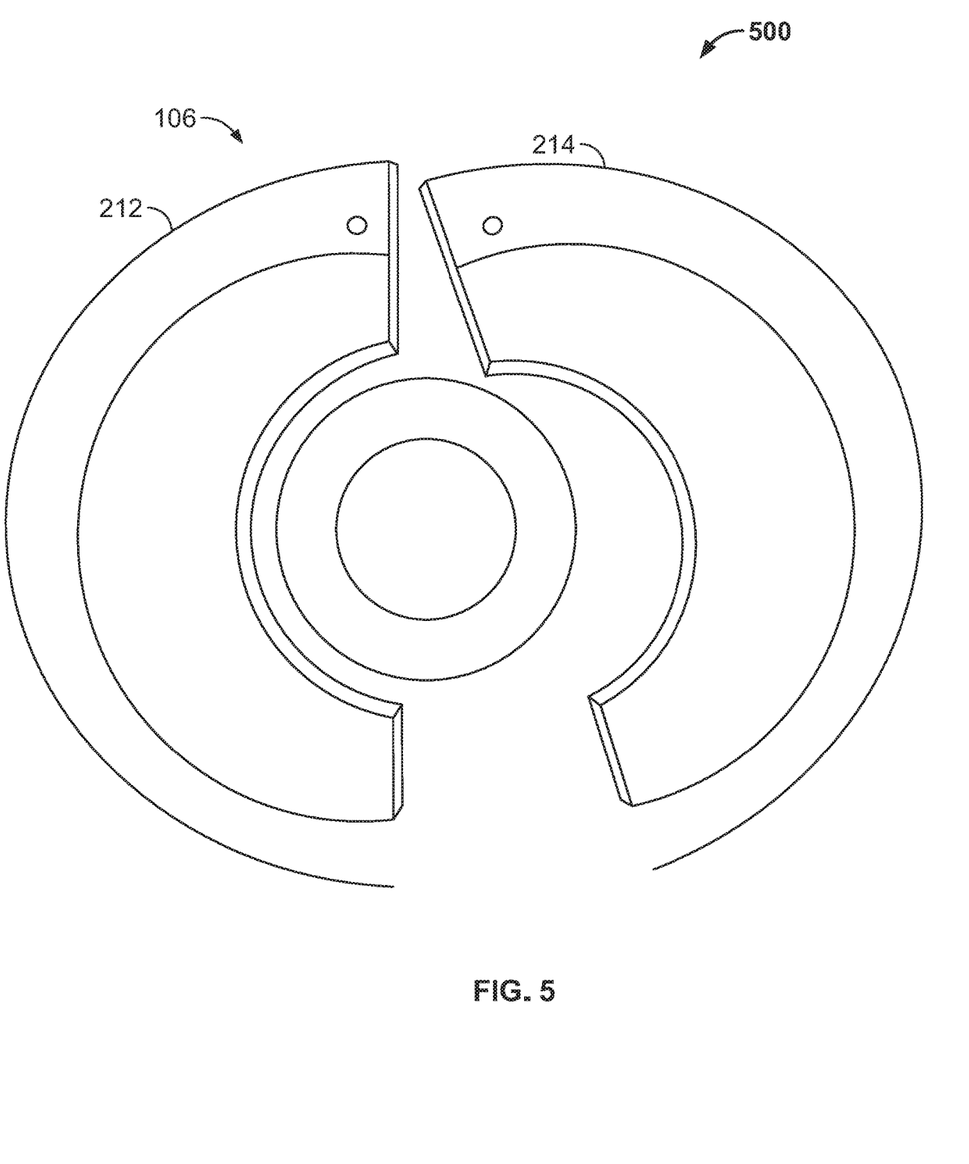
FIG. 5 is a schematic, front view of the example aircraft engine of FIGS. 1-4 in an open position.

FIG. 4 is a schematic front view of the aircraft engine 106 of FIGS. 1-3 showing the aircraft engine 106 in a closed position 400. FIG. 5 is a schematic front view of the aircraft engine 106 of FIGS. 1-4 showing the aircraft engine 106 in an open position 500.

Referring to FIGS. 4 and 5, to enable access to the engine core 206 (e.g., during maintenance), the first thrust reverser portion 214 (e.g., a thrust reverser door) and the second thrust reverser portion 216 (e.g., a thrust reverser door) are movably coupled to the pylon 108. For example, the first thrust reverser portion 214 and the second thrust reverser portion 216 are pivotally coupled to the pylon 108 via respective hinges 402, 404 to enable the first and second thrust reverser portions 214, 216 to move between the closed position 400 and the open position 500. The aircraft engine 106 of the illustrated example includes the seal system 200 to provide a seal at a first interface 406 between the pylon 108 and the thrust reverser 212, a second interface 408 between the thrust reverser 212 and the engine core 206, and a third interface 410 between the first thrust reverser portion 214 and the second thrust reverser portion 216.

The seal system 200 of the illustrated example includes a first seal 412 that engages a second seal 414. Thus, each of the interfaces 406-410 includes the first seal 412 and the second seal 414. For example, the first seal 412 can be coupled to the first thrust reverser portion 214 and the second seal 414 can be coupled to the second thrust reverser portion 216. Additionally, the first seal 412 can be provided around a perimeter (e.g., an edge) of the first wall 218 of the first thrust reverser portion 214 and the second seal 414 can be provided around a perimeter (e.g., an edge) of the second wall 220 of the second thrust reverser portion 216. In some examples, the pylon 108 can include the first seal 412 on a first side 416 of the pylon 108 to engage or interact with the second seal 414 of the second thrust reverser portion 216, and the pylon 108 can include the second seal 414 on a second side 418 of the pylon 108 opposite the first side 416 to engage or interact with the first seal 412 of the first thrust reverser portion 214. Likewise, the engine core 206 can include the first seal 412 to engage or interact with the second seal 414 of the second thrust reverser portion 216 and the second seal 414 to engage or interact with the first seal 412 of the first thrust reverser portion 214.

Figure 6:
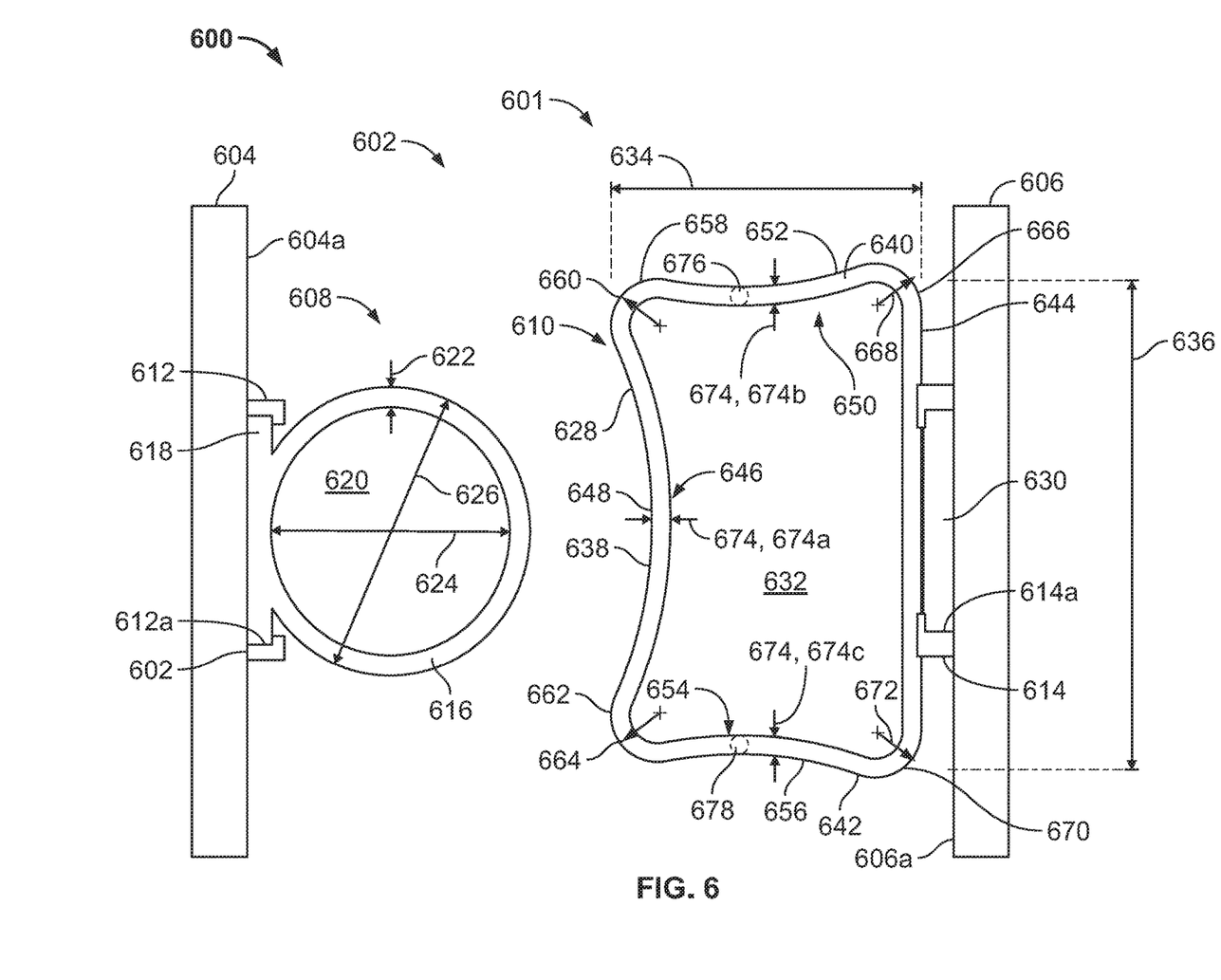
FIG. 6 is a partial, cross-sectional view of an example seal system disclosed herein shown in an uncompressed state.

FIG. 6 is a cross-sectional view of an example seal system 600 disclosed herein that can implement the example seal system 200 of FIGS. 1-5. The seal system 600 of the illustrated example is shown in an initial or uncompressed state 601. The seal system 600 of the illustrated example seals an interface 602 between a first structure 604 and a second structure 606. For example, the interface 602 can correspond to the first interface 406, the first structure 604 can correspond to the thrust reverser 212 (e.g., one of the first thrust reverser portion 214 or the second thrust reverser portion 216), and the second structure can be representative of the pylon 108. In some examples, the interface 602 can correspond to the second interface 408, the first structure 604 can correspond to the thrust reverser 212 (e.g., one of the first thrust reverser portion 214 or the second thrust reverser portion 216), and the second structure 606 can correspond to the engine core 206. In some examples, the interface 602 can correspond to the third interface 410, the first structure 604 can correspond to the first thrust reverser portion 214, and the second structure 606 can correspond to the second thrust reverser portion 216. In some examples, the interface 602 can correspond to any other interface between two structures of the aircraft engine 106.

The seal system 600 includes a first seal 608 (e.g., correspond to the first seal 222) and a second seal 610 (e.g., correspond to the second seal 224). The first seal 608 of the illustrated example is coupled to the first structure 604 and the second seal 610 is coupled to a second structure 606. The first seal 608 couples to the first structure 604 via a first retainer 612 and the second seal 610 couples to the second structure 606 via a second retainer 614.

The first seal 608 of the illustrated example includes a first sealing body 616 (e.g., a first bulb) and a first foot 618. The first foot 618 is positioned or coupled within a first channel 612a of the first retainer 612 located or formed on a first wall 604a (e.g., a surface or edge) of the first structure 604. For example, to couple the first seal 608 to the first structure 604, the first foot 618 of the first seal 608 can be positioned or slid within the first channel 612a of the first retainer 612. In some examples, the first seal 608 can be coupled to the first structure 604 via clips, staples, adhesive, and/or any other fastener(s). In some examples, the first seal 608 and/or the first sealing body 616 provides a first means for sealing and the first seal 608 and/or the first foot 618 provides a first means for attaching to the first retainer 612.

The first sealing body 616 of the illustrated example is a tubular structure defining a cavity 620. The first sealing body 616 has a length that extends along a perimeter or edge of the first wall 604a. The first sealing body 616 of the illustrated example has a first shape or structure. For example, the first sealing body 616 has a first cross-sectional shape (e.g., a circular cross-section). The first sealing body 616 of the illustrated example has a thickness 622 defined by an inner diameter 624 and an outer diameter 626. For example, the thickness 622 of the first sealing body 616 is uniform around a circumference of the first sealing body 616. However, in some examples, the thickness 622 of the first sealing body 616 can vary (e.g., increase or decrease) around the circumference of the first sealing body 616. In some examples, the thickness 622 of the first sealing body 616 is approximately between one-tenth (1/10) of an inch and a quarter (1/4) of an inch, the inner diameter 624 is between approximately 0.75 inches and 1.9 inches, and the outer diameter 626 is between approximately between 1 inch and 2 inches. In some examples, the first sealing body 616 can have an oblong cross-sectional shape, or any other shape(s).

The second seal 610 of the illustrated example includes a second sealing body 628 (e.g., a second bulb or cup seal) and a second foot 630. The second foot 630 is positioned or coupled within a second channel 614a of the second retainer 614 formed along a portion of a perimeter or edge of a second wall 606a of the second structure 606. For example, to couple the second seal 610 to the second structure 606, the second foot 630 of the second seal 610 can be positioned or slid within the second channel 614a of the second retainer 614. In some examples, the second seal 610 can be coupled to the second structure 606 via clips, staples, adhesive, and/or any other fastener(s). In some examples, the second seal 610 and/or the second sealing body 628 provides a second means for sealing and the second seal 610 and/or the second foot 630 provides a second means for attaching to the second retainer 614.

The second sealing body 628 of the illustrated example is a tubular structure having a cavity 632 and a length that extends along a portion of the perimeter or edge of the second wall 606a. The second sealing body 628 of the illustrated example has a shape or structure different than a shape of the first sealing body 616. For example, the second sealing body 628 of the illustrated example has a second cross-sectional shape different than the first cross-sectional shape of the first sealing body 616. The second sealing body 628 of the illustrated example has a rectangular cross-sectional shape. For example, the second sealing body 628 has a width 634 and a height 636. The height 636 of the illustrated example is greater than the width 634. However, in some examples, the width 634 can be less than or equal to the height 636. In some examples, the width 634 and/or the height 636 of the second sealing body 628 can be dependent on a dimension (e.g., the outer diameter 626 of) the first sealing body 616. For example, the width 634 can be approximately between 1 to 2 times greater than the outer diameter 626 of the first sealing body 616, and the height 636 can be approximately between 0.5 and 1.5 times the width 634 of the second sealing body 628.

The second sealing body 628 includes a first side 638 (e.g., a front or engaging surface), a second side 640 (e.g., an upper surface), a third side 642 (e.g., a lower surface), and a fourth side 644 (e.g., a rear surface). The first side 638 is located opposite the fourth side 644, and the second side 640 is located opposite the third side 642. The first side 638 has an arcuate shape or a first radius of curvature 646 having a concave portion 648 (e.g., a cup portion) facing toward the first sealing body 616. The second side 640 has an arcuate shape or second radius of curvature 650 having a concave portion 652 facing away from the third side 642. The third side 642 has an arcuate shape or third radius of curvature 654 having a concave portion 656 oriented away from the second side 640. The fourth side 644 is substantially planar or straight. The second foot 630 of the illustrated example protrudes from the fourth side 644.

A first transition 658 (e.g., a first corner) between the first side 638 and the second side 640 has a first radius of curvature 660, a second transition 662 (e.g., a second corner) between the first side 638 and the third side 642 has a second radius of curvature 664, a third transition 666 (e.g., a third corner) between the second side 640 and the fourth side 644 has a third radius of curvature 668, and a fourth transition 670 (e.g., a fourth corner) between the third side 642 and the fourth side 644 has a fourth radius of curvature 672. In the illustrated example, the first radius of curvature 660 is substantially similar or identical to (e.g., within 1% of) the second radius of curvature 664. The third radius of curvature 668 is substantially similar or identical to (e.g., within 1% of) the fourth radius of curvature 672. The first radius of curvature 660 and the second radius of curvature 664 are different from the third radius of curvature 668 and the fourth radius of curvature 672.

Additionally, the second sealing body 628 of the illustrated example has a thickness 674. In some examples, the thickness 674 of the second sealing body 628 varies (e.g., increases or decreases) along a perimeter of the second sealing body 628. For example, a first thickness 674a of at least a portion of the first side 638 can be different than a second thickness 674b of at least a portion of the second side 640 and/or a third thickness 674c of at least a portion of the third side 642. In some examples, the thickness 674 can be uniform or constant around a perimeter of the second sealing body 628.

The second seal 610 of the illustrated example is structured to partially collapse in response to the first seal 608 engaging the second seal 610. For example, the second seal 610 of the illustrated example is structured to deflect and/or conform to at least partially receive the first seal 608 (e.g., a portion of the first sealing body 616). To enable the first side 638 to deflect and/or conform to the first seal 608, the second seal 610 of the illustrated example includes a first pivot 676 and a second pivot 678. The first pivot 676 of the illustrated example is located or formed on the second side 640 and the second pivot 678 of the illustrated example is located or formed on the third side 642. Specifically, the first pivot 676 is positioned at or adjacent a midpoint between the first side 638 and the fourth side 644, and the second pivot 678 is positioned at or adjacent a midpoint between the first side 638 and the fourth side 644.

The pivots 676, 678 can be formed as living hinges. For example, to provide the first pivot 676 and the second pivot 678, the second thickness 674b of a portion of the second side 640 defining the second pivot 676 and the third thickness 674c of a portion of the third side 642 defining the second pivot 678 can be less than the thickness 674 of the other portions of the second side 640 and the third side 642 that do not define the first and second pivots 676, 678. The first and second pivots 676, 678 are flexible to allow rotation of the first and second transitions 658, 662 (e.g., without causing fatigue or cracking of the second and third sides 640, 642). Additionally, the second side 640 and the third side 642 each have a stiffness characteristic to resist buckling while allowing rotation about the first and second pivots 676, 678. The stiffness characteristic of the second and third sides 640, 642 can be increased by increasing a number of fabric layers of the second and third sides 640, 642.

Additionally, the first seal 608 of the illustrated example has a stiffness characteristic that is greater than a stiffness characteristic of the second seal 610. In some examples, the stiffness characteristic of the first seal 608 is greater than the stiffness characteristic of the second seal 610 due to the cross-sectional shape of the first sealing body 616 compared to the cross-sectional shape of the second sealing body 628. In some examples, the stiffness characteristic of the first seal 608 can be greater than the stiffness characteristic of the second seal 610 due to material characteristic(s) of the first seal 608 and the second seal 610.

The first seal 608 and the second seal 610 of the illustrated example can be composed of the same material(s) or different material(s). The first seal 608 and/or the second seal 610 can be composed of materials including fiberglass and/or ceramic fabric impregnated with silicone (e.g., high temperature silicone), metallic materials, elastomeric materials and/or any other material(s).

Figure 7:
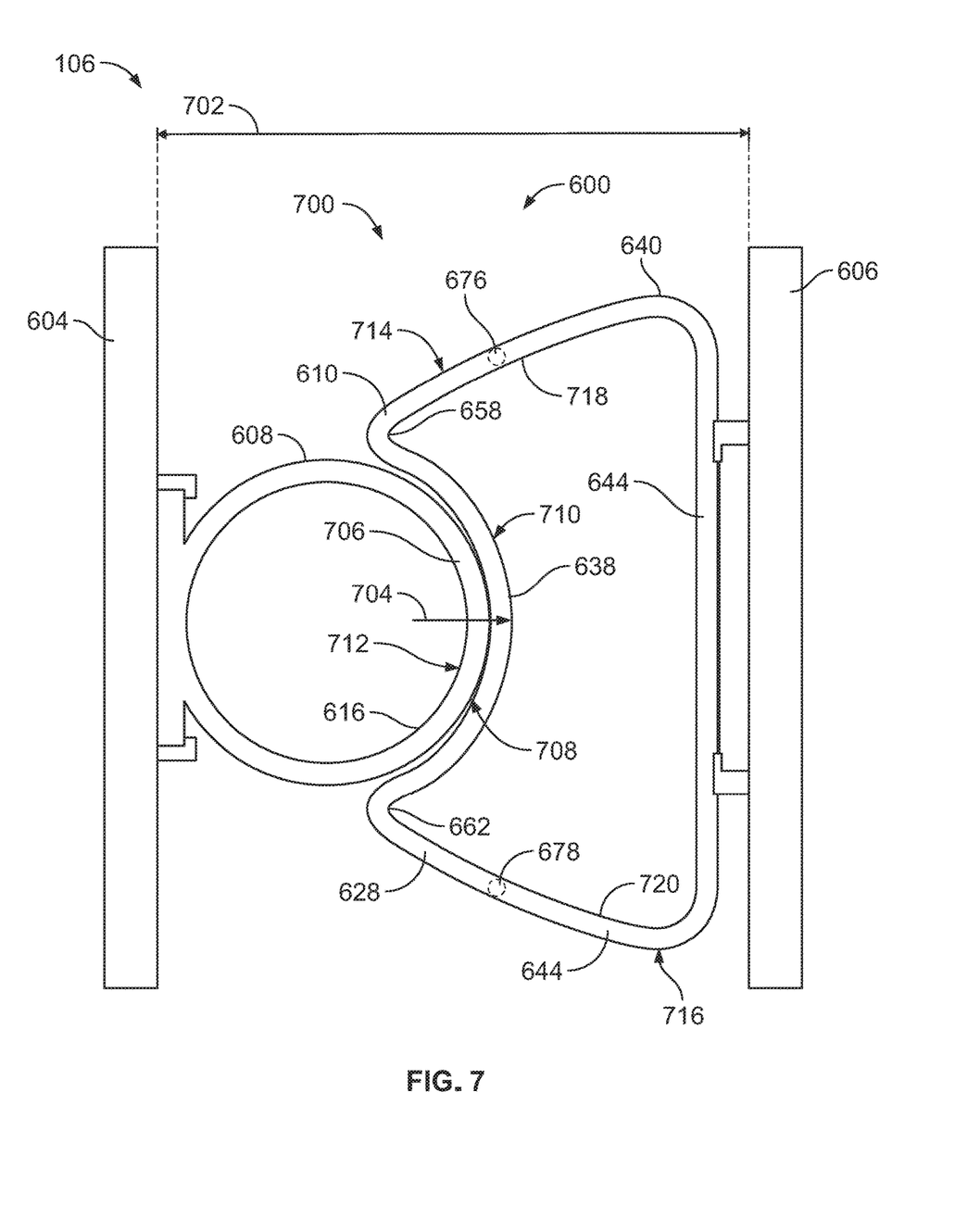
FIG. 7 is a partial, cross-sectional view of the example seal system of FIG. 6 shown in a compressed state.

FIG. 7 is a cross-sectional view of the seal system 600 of FIG. 6 shown in a compressed state 700 (e.g., an active condition). Specifically, the seal system 600 of the illustrated example seals a gap 702 between the first and second structures 604, 606. A size of the gap 702 can vary due to different flight conditions (e.g., pressure fluctuations, temperature fluctuations, etc.) during flight. For example, the size of the gap 702 can increase or decrease approximately 0.3 inches. In some instances, the size of the gap 702 can increase or decrease more than 0.3 inches.

In response to the first seal 608 engaging the second seal 610, the first seal 608 imparts a force 704 to the first side 638 of the second seal 610 causes the first side 638 to compress and/or move toward the fourth side 644. In turn, the second seal 610 at least partially deforms and/or conforms to a shape of the first sealing body 616. For example, at least a portion of the second sealing body 628 deforms and/or wraps around at least a portion or segment 706 of the first sealing body 616 in response to the first seal 608 engaging the second seal 610. Specifically, the second seal 610 deforms and/or collapses about the first pivot 676 and the second pivot 678 such that the first side 638 of the second seal 610 sealingly engages the segment 706 of the first seal 608. In response to the second seal 610 collapsing, the second sealing body 628 forms a pocket 708 to receive at least the portion of the first sealing body 616. The first side 638 of the second sealing body 628 defining the pocket 708 forms a shape that is complementary to a shape of the first sealing body 616 that is in engagement with the second sealing body 628. For example, the first pivot 676 and the second pivot 678 enable the respective first and second transitions 658, 662 to move (e.g., roll or pivot) inward toward the first sealing body 616 (e.g., toward an outer surface of the first sealing body 616). In other words, the second seal 610 at least partially collapses in response to the first seal 608 engaging the second seal 610 to enable at least a portion of the second seal 610 (e.g., the first side 638) to wrap around at least a portion (e.g., the segment 706) of the first seal 608. For example, the first side 638 of the second sealing body 628 at least partially surrounds (e.g., between 40% and 60% of a circumference of) the first sealing body 616 when the seal system 600 is in the compressed state 700. The first pivot 676 and the second pivot 678 provide flexibility to allow rotation of the respective first and second transitions 658, 662 and/or the second and third sides 640, 642 without causing fatigue or cracking to the first and second transitions 658, 662 and/or the second and third sides 640, 642.

Additionally, the first side 638 has a fourth radius of curvature 710 when the seal system 600 is in the compressed state 700 that is different than (e.g., less than) the first radius of curvature 646 of the first side 638 when the seal system 600 is in the uncompressed state 601 (FIG. 6). For example, the fourth radius of curvature 710 of the first side 638 is substantially similar to (e.g., equal to or within 5% of) a radius of curvature 712 of the first sealing body 616 when the seal system 600 is in the compressed state 700. Further, although not shown, the first sealing body 616 of the first seal 608 can deform or compress (e.g., have an oblong shape) when the first seal 608 engages the second seal 610 and/or when a size of the gap 702 decreases. In some such examples, the first side 638 conforms to a shape (e.g., an oblong shape) of the first sealing body 616 that is in contact (e.g., direct engagement) with the first side 638 of the second sealing body 628. Thus, in some examples, at least a portion of the second sealing body 628 (e.g., the first side 638) has a cross-sectional shape that is complementary to a cross-sectional shape of the portion of the first sealing body 616 of the first seal 608 in engagement with the second seal 610.

Similarly, the second side 640 has a fifth radius of curvature 714 when the seal system 600 is in the compressed state 700 that is different than the second radius of curvature 650 of the second side 640 when the seal system 600 is in the uncompressed state 601 (FIG. 6). Likewise, the third side 642 has a sixth radius of curvature 716 when the seal system 600 is in the compressed state 700 that is different than the third radius of curvature 654 of the third side 642 when the seal system 600 is in the uncompressed state 601 (FIG. 6). In some examples, a concave portion 718 of the second side 640 of the second seal 610 is facing a concave portion 720 of the third side 642 of the second seal 610 when the seal system 600 is in the compressed state 700 (i.e., the concave portions 718, 720 are in the opposite orientation compared to the respective concave portions 652, 656 shown in FIG. 6).

Figure 8:
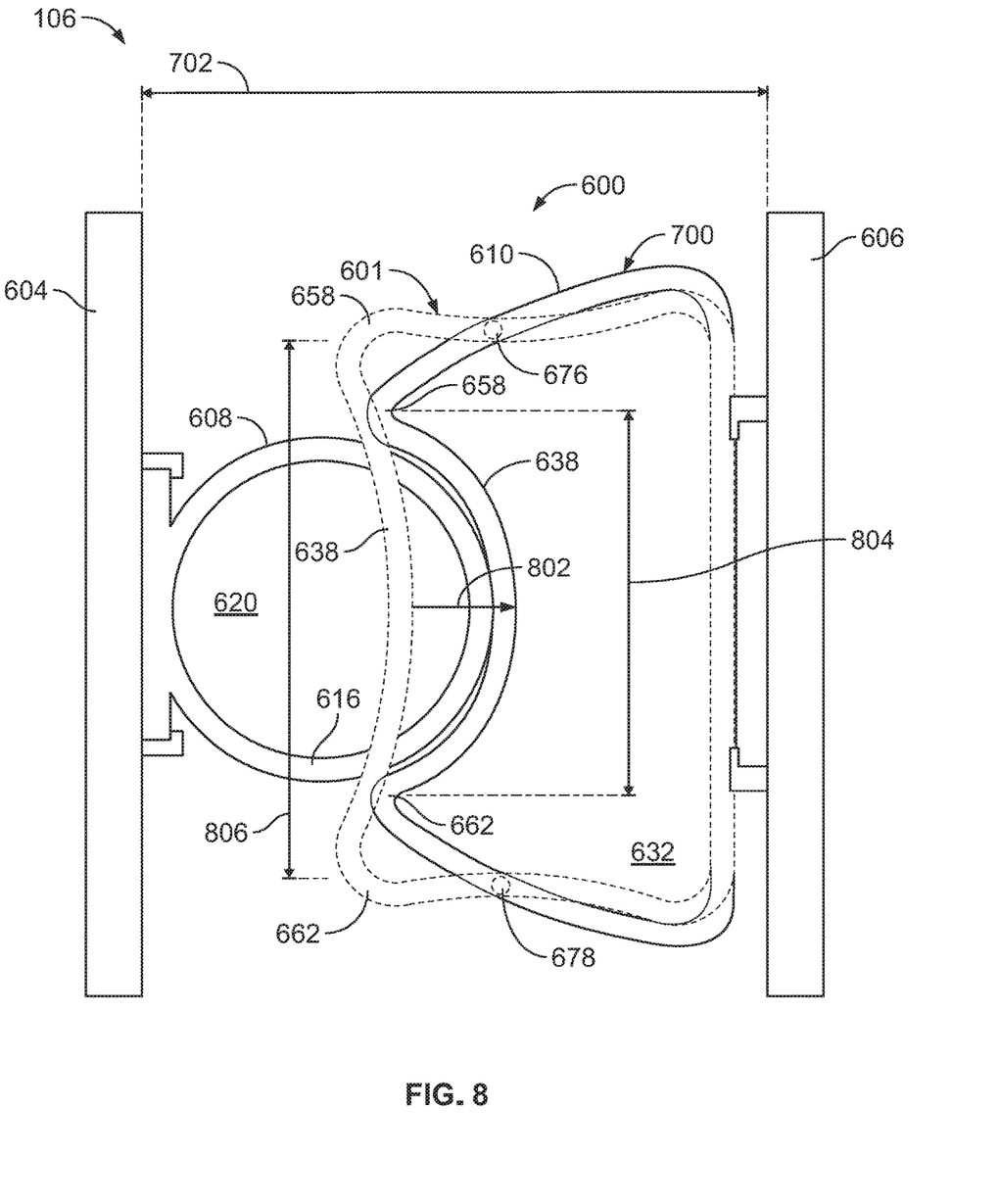
FIG. 8 is a partial, cross-sectional view of an example second seal of the example seal system of FIGS. 6 and 7 shown in dashed lines when the example seal system is in the example uncompressed state and showing the example second seal in solid lines when the example seal system is in the example compressed state.

FIG. 8 illustrates the second seal 610 in solid lines when the seal system 600 is in the compressed state 700 and illustrates the second seal 610 in dashed lines when the seal system 600 is in the uncompressed state 601. Thus, for example, the first and second seals 608, 610 move between the uncompressed state 601 of FIG. 6 and the compressed state 700 of FIG. 7 when the gap 702 varies and/or when the first structure 604 (e.g., the first thrust reverser portion 214) moves to an open position (e.g., the open position 500 of FIG. 5) relative to the second structure 606 (e.g., the second thrust reverser portion 216). As the first side 638 moves in a direction 802 toward the fourth side 644, the first transition 658 and the second transition 662 move toward the first sealing body 616. For example, a distance 804 (e.g., a vertical distance in the orientation of FIG. 8) between the first transition 658 and the second transition 662 when the second seal 610 is in the compressed state 700 is less than a distance 806 between the first transition 658 and the second transition 662 when the second seal 610 is in the uncompressed state 601.

The deflection or cupping of the first side 638 of the second seal 610 relative to the first sealing body 616 of the first seal 608 increases a contact surface area between the first seal 608 and the second seal 610. Increasing the contact surface area between the first seal 608 and the second seal 610 significantly increases a frictional or sealing force between the first seal 608 and the second seal 610. As a result, a seal provided between the first seal 608 and the second seal 610 that can withstand greater amounts of forces during operation. For example, the seal can withstand greater amounts of force from high pressure airflow passing through the bypass 308 (FIG. 3) and, thus, provides an improved barrier against air leakage compared to traditional seals. In some examples, the seal system 600 of the illustrated example creates a tortuous path for fire and, thus, is more effective at containing fire within the core compartment fire zone 310 (FIG. 3) compared to traditional seals.

Additionally, during operation, a size of the gap 702 can vary during flight. For example, due to pressure fluctuations, the gap 702 can increase or decrease by between about 0.5 inches and 3 inches. In some examples, the gap 702 can be more than 3 inches. The first seal 608 remains in sealing engagement with the second seal 610 as the size of the gap 702 varies because the first and second pivots 676, 678 enable the first and second transitions 658, 662 to move or rotate with the first sealing body 616 to maintain a seal. Due to the flexibility of the first seal 608 and the second seal 610, the seal system 600 of the illustrated example is more effective at sealing a larger range of deflection than traditional seals. In some examples, to improve cup seal compression characteristic(s) of the seal system 600, a foam structure (e.g., a tubular structure) can be positioned in the cavity 620 of the first seal 608 and/or the cavity 632 of the second seal 610.

From the foregoing, it will be appreciated that example methods, apparatus and articles of manufacture improve seal effectiveness by increasing a seal contact area and/or a frictional force between seals. This improved seal effectiveness provides an improved barrier against air leakage and/or fire containment. Additionally, increased seal contact area enables the seals to be more tolerant to defects or surface repairs and/or enables the seal systems to be more effective under larger range of deflections. In some examples, increased seal contact area reduces over-compression, thereby reducing damage that can otherwise be caused by over-compression of the seals. In some examples, increased seal contact area reduces damage to surfaces of the seals that can otherwise occur due to relative motion (e.g., rubbing) between the seals.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

At least some of the aforementioned examples include one or more features and/or benefits including, but not limited to, the following:

Example 1 includes a seal system having a first seal to couple to a first thrust reverser portion, where the first seal has a first cross-sectional shape. A second seal to couple to a second thrust reverser portion opposite the first seal. The second seal having a second cross-sectional shape different than the first cross-sectional shape. The second seal is to receive at least a portion of the first seal in response to the first seal engaging the second seal.

Example 2 includes the system of Example 1, where the first seal has a circular cross-sectional shape when the first seal is in an uncompressed state.

Example 3 includes the system of any one of Examples 1-2, where the second seal has a rectangular cross-sectional shape.

Example 4 includes the system of any one of Examples 1-3, where the second seal is rotatable about a first pivot and a second pivot to enable a first portion of the second seal sealingly engages a segment of the first seal.

Example 5 includes the system of any one of Examples 1-4, where the second seal is to at least partially collapse in response to the first seal engaging the second seal to enable at least a portion of an outer surface of the second seal to wrap around at least a portion of an outer surface of the first seal.

Example 6 includes the system of any one of Examples 1-5, where the first seal includes a first foot to couple the first seal to the first thrust reverser portion, and the second seal includes a second foot to couple the second seal to the second thrust reverser portion, the first seal to engage the second seal when the first thrust reverser portion and the second thrust reverser portion are in a closed position.

Example 7 includes the system of any one of Examples 1-6, where the first seal and the second seal are composed of the same materials.

Example 8 includes the system of any one of Examples 1-7, where the first seal and the second seal are composed of different materials.

Example 9 includes an aircraft including an engine having thrust reverser portions and the seal system of any one of Examiners 1-8.

Example 10 includes a seal system having a first seal including a first sealing body, and a second seal including a second sealing body. At least a portion of the second sealing body to deform and wrap around at least a portion of the first sealing body in response to the first seal engaging the second seal.

Example 11 includes the system of Example 10, where the first sealing body has a circular cross-sectional shape when the first sealing body is in an uncompressed state and the second sealing body has a rectangular cross-sectional shape when the second sealing body is in an uncompressed state.

Example 12 includes the system of any one of Examples 10-11, where the second sealing body is structured to partially collapse in response to the first seal engaging the second seal.

Example 13 includes the system of any one of Examples 10-12 where, in response to the second seal collapsing, the second sealing body forms a pocket to receive the at least the portion of the first sealing body Example 14 includes the system of any one of Examples 10-13, where an outer surface of the second sealing body defining the pocket conforms to a shape that is complementary to a shape of the first sealing body in engagement with the outer surface of the second sealing body in response to the first seal engaging the second seal.

Example 15 includes the method of any one of Examples 10-14, where at least a portion of the second sealing body has a cross-sectional shape that is complementary to a cross-sectional shape of the at least the portion of the first sealing body when the first seal engages the second seal.

Example 16 includes the system of any one of Examples 10-15, where the first seal includes a first foot to attach the first sealing body to a first structure, the first foot to be received by a channel of the first structure.

Example 17 includes the system of any one of Examples 10-16, where the second seal includes a second foot to attach the second sealing body to a second structure, the second foot to be received by a channel of the second structure Example 18 includes the system of any one of Examples 10-17, where a distance between a first transition and a second transition of the second seal when the seal system is in an uncompressed state is greater than a distance between the first transition and the second transition when the seal system is in a compressed state.

Example 19 includes an example seal system having first means for sealing, where the first means for sealing has a first cross-sectional shape, and second means for sealing, where the second means for sealing having a second cross-sectional shape different than the first cross sectional shape. The second means for sealing is to receive at least a portion of the first means for sealing in response to the first means for sealing engaging the second means for sealing.

Example 20 includes the system of Example 19, where the first means for sealing includes a first means for attaching the first means for sealing to a first portion of a first structure.

Example 21 includes the system of any one of Examples 19-20, where the second means for sealing includes a second means for attaching the second means for sealing to a second portion of a second structure.

Example 23 includes a method including engaging a first seal having a first sealing body with a second seal having a second sealing body to cause at least a portion of the second sealing body to deform and wrap around at least a portion of the first sealing body in response to the first seal engaging the second seal.

Example 24 includes the method of Example 23, further including the second sealing body partially collapsing in response to the first seal engaging the second seal.

Example 25 includes the system of any one of Examples 23-24, further including the second sealing body forming a pocket to receive the at least the portion of the first sealing body in response to the second sealing body partially collapsing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A seal system comprising:
   a first seal to couple to a first thrust reverser portion, the first seal having a first cross-sectional shape; and
   a second seal to couple to a second thrust reverser portion opposite the first seal, the second seal having a second cross-sectional shape different than the first cross-sectional shape, the second seal to receive at least a portion of the first seal in response to the first seal engaging the second seal, the second seal being rotatable about a first pivot and a second pivot to enable a first portion of the second seal to sealingly engage a segment of the first seal.

2. The seal system of claim 1, wherein the first seal has a circular cross-sectional shape when the first seal is in an uncompressed state.

3. The seal system of claim 2, wherein the second seal has a rectangular cross-sectional shape.

4. A seal system comprising:
   a first seal to couple to a first thrust reverser portion, the first seal having a first cross-sectional shape; and
   a second seal to couple to a second thrust reverser portion opposite the first seal, the second seal having a second cross-sectional shape different than the first cross-sectional shape, the second seal to receive at least a portion of the first seal in response to the first seal engaging the second seal, the second seal is to at least partially collapse in response to the first seal engaging the second seal to enable at least a portion of an outer surface of the second seal to wrap around at least a portion of an outer surface of the first seal.

5. The seal system of claim 1, wherein the first seal includes a first foot to couple the first seal to the first thrust reverser portion, and the second seal includes a second foot to couple the second seal to the second thrust reverser portion, the first seal to engage the second seal when the first thrust reverser portion and the second thrust reverser portion are in a closed position.

6. The seal system of claim 1, wherein first seal and the second seal are composed of the same materials.

7. The seal system of claim 1, wherein first seal and the second seal are composed of different materials.

8. An aircraft including an engine having thrust reverser portions and the seal system of claim 1.

9. A seal system comprising:
   a first seal having a first sealing body and a first foot to couple the first seal to a first structure, wherein the first foot is to be received by a channel of the first structure, the first sealing body has a circular cross-sectional shape when the first sealing body is in an uncompressed state; and
   a second seal having a second sealing body and a second foot to couple the second seal to a second structure, the second sealing body has a rectangular cross-sectional shape when the second sealing body is in an uncompressed state, at least a portion of the second sealing body to deform and wrap around at least a portion of the first sealing body in response to the first seal engaging the second seal.

10. The seal system of claim 9, wherein the second sealing body is structured to partially collapse in response to the first seal engaging the second seal.

11. The seal system of claim 10, wherein, in response to the second seal collapsing, the second sealing body forms a pocket to receive the at least the portion of the first sealing body.

12. A seal system comprising:
    a first seal having a first sealing body and a first foot to couple the first seal to a first structure, the first sealing body has a circular cross-sectional shape when the first sealing body is in an uncompressed state; and
    a second seal having a second sealing body and a second foot to couple the second seal to a second structure, the second sealing body having a rectangular cross-sectional shape when the second sealing body is in an uncompressed state, at least a portion of the second sealing body is to structured to partially collapse to deform and wrap around at least a portion of the first sealing body in response to the first seal engaging the second seal, and in response to the second seal collapsing, the second sealing body forms a pocket to receive the at least the portion of the first sealing body, wherein an outer surface of the second sealing body defining the pocket conforms to a shape that is complementary to a shape of the first sealing body in engagement with the outer surface of the second sealing body in response to the first seal engaging the second seal.

13. The seal system of claim 9, wherein the second foot is to be received by a channel of the second structure.

14. The seal system of claim 9, wherein a distance between a first transition and a second transition of the second seal when the seal system is in an uncompressed state is greater than a distance between the first transition and the second transition when the seal system is in a compressed state.

15. A seal system comprising:
    first means for sealing to couple to a first thrust reverser portion, the first means for sealing having a first cross-sectional shape, the first means for sealing having a first means for attaching to be received by a channel of the first structure; and
    second means for sealing to couple to a second thrust reverser portion opposite the first means for sealing, the second means for sealing having a second cross-sectional shape different than the first cross-sectional shape, the second means for sealing having a second means for attaching to be received by a channel of the second structure, the second means for sealing to at least partially collapse in response to the first means for sealing engaging the second means for sealing to enable at least a portion of an outer surface of the second means for sealing to wrap around at least a portion of an outer surface of the first means for sealing.

16. The seal system of claim 15, wherein the first means for sealing includes a first means for attaching the first means for sealing to a first portion of a first structure.

17. The seal system of claim 16, wherein the second means for sealing includes a second means for attaching the second means for sealing to a second portion of a second structure.

18. A method comprising:
engaging a first seal having a first sealing body with a second seal having a second sealing body, the second seal is rotatable about a first pivot formed along a first side of the second seal and a second pivot formed along a second side of the second seal opposite the first pivot, the first pivot and the second pivot to cause at least a portion of the second sealing body to deform and wrap around at least a portion of an outer surface of the first sealing body in response to the first seal engaging the second seal.

19. The method of claim 18, further including the second sealing body partially collapsing about the first and second pivots in response to the first seal engaging the second seal.

20. The method of claim 19, further including the second sealing body forming a pocket to receive the at least the portion of the first sealing body in response to the second sealing body partially collapsing.

21. The seal system of claim 1, wherein the first seal includes a first foot to couple the first seal to the first thrust reverser portion, and the second seal includes a second foot to couple the second seal to the second thrust reverser portion, the first seal to engage the second seal when the first thrust reverser portion and the second thrust reverser portion are in a closed position.

* * * * *